Fig. 1. Original Positive To Be Colored
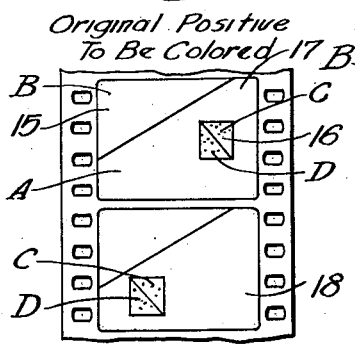
Fig. 2. Back Ground Color Plate
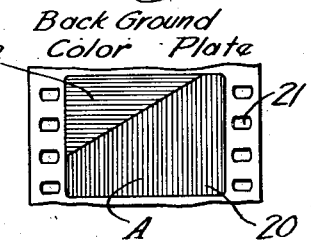
Fig. 3. Duplicate Positive Blocked Out
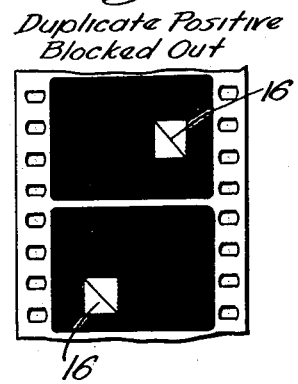
Fig. 4. Negative
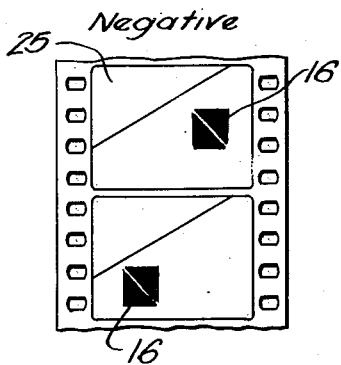
Fig. 5. 2nd Positive
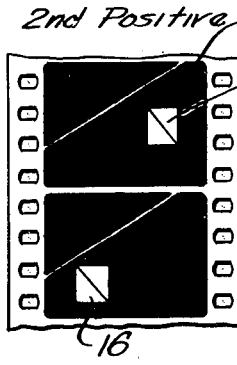
Fig. 6. 2nd Positive
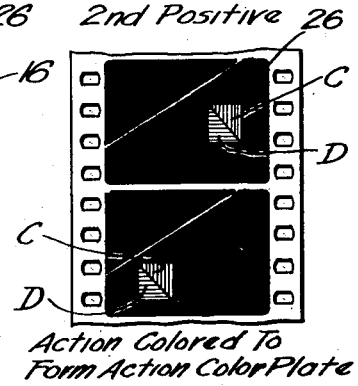
Action Colored To Form Action Color Plate
Fig. 7.
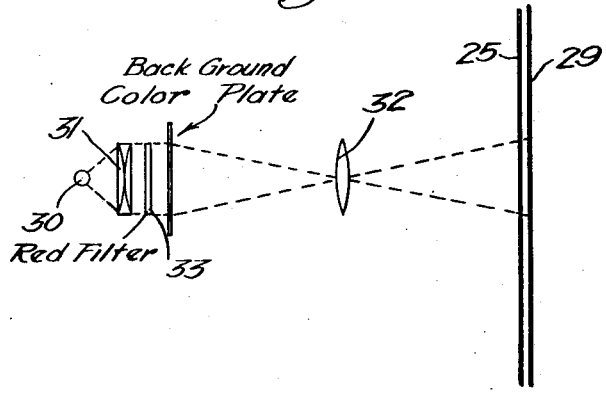

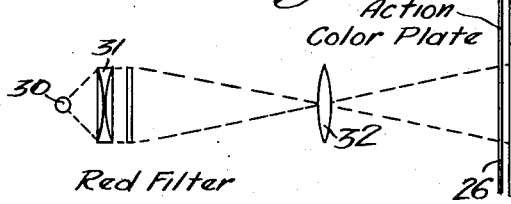
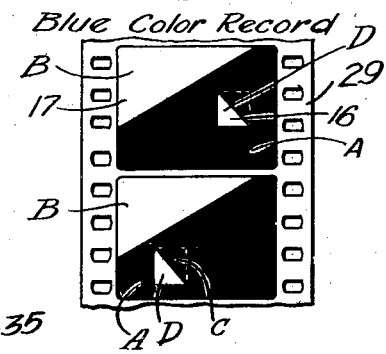
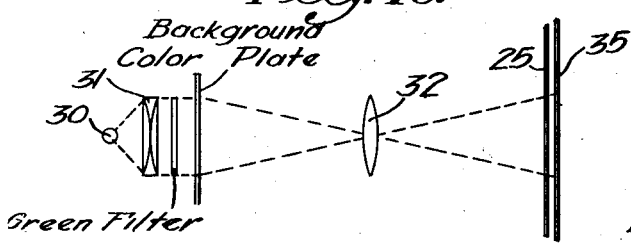
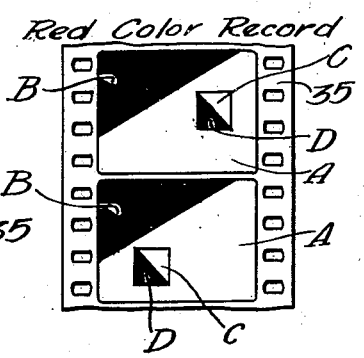
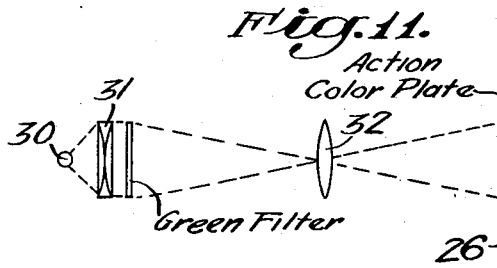
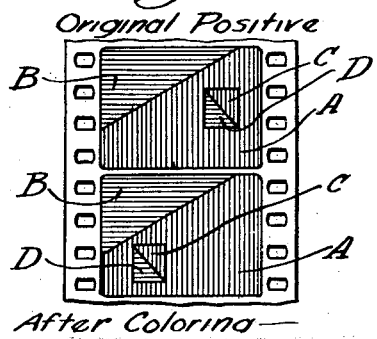

Patented July 14, 1925.

1,546,129

UNITED STATES PATENT OFFICE.

MAX HANDSCHIEGL, OF LOS ANGELES, CALIFORNIA.

FILM-COLORING PROCESS.

Application filed May 12, 1923. Serial No. 638,606.

*To all whom it may concern:*

Be it known that I, MAX HANDSCHIEGL, a citizen of the United States, residing at Los Angeles, in the county of Los Angeles and State of California, have invented a new and useful Film-Coloring Process, of which the following is a specification.

This invention relates to the art of color cinematography and is more particularly a simplified process for coloring photographic films.

In the coloring of motion pictures, color screens are employed for blocking out certain portions of the images of a negative film, so that certain colors of a scene will be represented upon the negative in the form of opaque or exposed portions to which dye or color is applied and thence imprinted upon a positive film. It is customary in certain processes, to employ color screens in the photographing camera and to take several negatives of the scene simultaneously, the negatives being taken through color screens of different colors so that separate color records are thereby formed. In other coloring methods, the colors are applied by hand, this of course, being unsatisfactory owing to the fact that the work is very tedious and the general result is an uneven distribution of colors with unsatisfactory results when the picture is projected upon the screen.

It is an object of my invention to provide a process, whereby a positive film may be quickly colored in such a manner that the background of the picture when projected will appear substantially steady upon the screen owing to the perfect placement of the colors thereupon. When it is attempted to color backgrounds by hand, a result is obtained which causes a wavering in the colored image when the film is projected due to the fact that it is practically impossible to distribute the colors upon a background the same throughout a great number of frames. It is for this reason that the taking of separate negatives through color screens at the time the picture is photographed is resorted to so that the background may be imprinted by the color records thus formed.

My invention, however, enables a background to be properly and evenly colored without the photographing of separate negatives through color screens at the time of taking the picture.

Referring to the drawings which are for illustrative purposes only:

Fig. 1 is a view of a fragment of an original positive film which is to be colored.

Fig. 2 shows the background master color plate which is prepared from the original positive.

Fig. 3 shows the duplicate positive in which the background has been blocked out with an opaque dye.

Fig. 4 shows a negative printed from the duplicate positive.

Fig. 5 is a representation of a second positive printed from the negative shown in Fig. 4.

Fig. 6 shows the second positive with color applied to the action thereof.

Fig. 7 diagrammatically illustrates the manner in which a red color record is light impressed through the background master color plate.

Fig. 8 diagrammatically illustrates the manner in which the red color record is light impressed with the red colored portions of the action color plate shown in Fig. 6.

Fig. 9 is a view showing the blue color record.

Fig. 10 is a diagrammatic view showing the manner in which the blue color record is light impressed through the back-ground master plate.

Fig. 11 diagrammatically illustrates a step in which the blue color record is light impressed with the blue colored portion of the action color plate.

Fig. 12 shows the red color record thus formed.

Fig. 13 is a view showing the original positive after it has been imprinted with colors from the color records shown in Fig. 9 and Fig. 12.

In the ordinary printing of negatives from positives, and of positives from negatives, the images are inverted. For the sake of simplicity to permit the different operations to be readily traced, the negatives shown in the drawings are represented as rectified images.

In Fig. 1, a portion of a positive film to be colored, is represented. In order to simplify the exemplification of my process, the background 15 and the image 16 are diagrammatically illustrated. The background 15 consists of two areas A and B which are to be respectively colored red and blue. The action 16 is comprised of areas C and D which are also to be colored red and blue respectively. It will be recognized that the elements and objects entering into the background 15 are without movement, but the action moves back and forth before the background. To represent the movement of the action 16, it is shown in changed positions in the frames 17 and 18 of the original positive.

A portion of clear film or other transparent substance capable of receiving dyes is placed upon the original positive so that the areas A and B appear therethrough, whereupon these areas A and B are colored in on the surface of the transparent sheet to form a background color plate. It is preferable to employ for this purpose a frame 20, cut from a piece of clear non-sensitized film, because of the fact that the frame 20 may be easily registered upon the separate frames of the original positive by bringing the perforations 21 thereof into register with the perforations of the original positive. It is generally necessary to move the background color plate from one frame of the original positive to another because the action obscures a portion of the background in one frame, but moves to another position in a following frame, thus exposing the background so that the objects originally obscured may be colored in upon the background master plate.

A duplicate positive film which is a replica of the original positive, owing to the fact that it may be printed from the original negative from which the original positive is obtained, has the background of each frame blocked out by painting over, or otherwise suitably covering, the background with an opaque dye, leaving the action 16 translucent. The duplicate positive shown in Fig. 3, being thus blocked out, will permit the passage of light only through those portions constituting the action 16 and from this positive, a negative as shown in Fig. 4 is obtained. In the development of the negative, a contrasting effect or in other words, an over-development is obtained which causes a surplus deposit of silver oxide on the light exposed portions of the negative, so that the action is brought out in the negative in the form of an opaque field, having the outline of the action, but registering no tone variations. The excess deposit of silver thereupon, causes the action of the negative to be substantially opaque, whereas, the area of each frame surrounding the action is transparent, owing to the fact that there was no passage of light through the blocked out portions of the duplicate positive to cause the exposure of any portion of the area corresponding to the background 15.

From the negative 25, a second positive 26, as shown in Fig. 5 is printed. Each frame of this second positive, as will be plainly evident, will have a transparent area representing the action 16, while the area surrounding the action will be fully exposed and in development will receive an opaque deposit of silver oxide. The second positive 26 then has the colors of the action placed upon the transparent areas representing the action. This may be accomplished by placing the second positive upon the original and then painting in the red and blue colors respectively in the areas C and D, thus forming an action color plate having the colors of the areas C and D placed thereupon, and having the areas surrounding the action 16 opaque so that no light may possibly pass through the film except through the colored areas C and D of the action.

A sensitized film 29 is then placed in a printing machine, this printing machine, as indicated in Fig. 7 may be of the projection type, employing a light 30 and a condenser 31 which direct light rays through a lens arrangement, as indicated at 32. The negative 25, shown in Fig. 4 is placed in front of the sensitized film 29 and is run through the printing machine therewith. A red color filter 33 is placed in the printer in such a position that the printing light must pass therethrough, and the background color plate shown in Fig. 2 is mounted stationarily in registered position, so that the light rays which are projected upon the film 29 must pass therethrough. By using a background color plate and projecting the printing rays therethrough, a light impression of the sensitized film 29 is obtained which as hereinafter described, enables the coloring of the background of the original positive in such a manner that there will be no wavering therein due to the unequal and improper placing of the colors upon the background which now results in the coloring of a film by hand.

The light rays from the condenser 31, being red in color, will pass through the red filter 33 which allows the passage therethrough of red rays of light only. This red light from the filter is then impinged upon the background color plate which has a blue colored area and a red colored area. The blue area obstructs or absorbs the red light rays, thus preventing the passage of light through the area B, while the red portion A of the background master plate permits the passage of the red light rays therethrough so that those portions of the film 29 upon which the red rays strike will be exposed.

It will be recognized that the action 16 of the negative 25 is opaque and will therefore prevent the passage of any light rays, so that upon the film 29, only those portions thereof surrounding the position of the action may be exposed to the red light rays which have been permitted to pass through the red portion of the background color plate. In this manner a blue color record of the background is obtained upon the film 29.

The background color plate is then removed from the printer, but the red filter is left in place. The film 29 having those portions thereof corresponding to the red background light impressed thereupon is again run through the printer, but in this instance has the action color plate previously formed from the second positive 26, run through in registration therewith, the colored action of each frame of the action color plate being in registration with the unexposed action areas of the film 29, which were blocked out by the opaque portion of the image 16. The red light rays from the filter 33 strike the action color plate and pass through only those portions of the action 16 which have been colored red, therefore light impressing upon the film 29 a color record of the blue colored areas of the action. The film 29 is then developed.

From the foregoing, it will be perceived that in the operation to which it was subjected in the printer, only the areas A of the background 15 and the areas C of the action 16 have been exposed. Therefore, in the development of the blue color record which the film 29 represents, these areas will receive an opaque hardened silver deposit while the areas B and D corresponding to the positions of the blue colors on the color plates shown in Figs. 2 and 6, will be transparent, owing to the fact that they were not exposed to light. The film 29 is then placed in a bath of blue dye whereupon the blue dye impregnates the transparent portions B and D thereof, but does not adhere to the exposed portions. This blue color record, it will be understood, is a negative and the images thereof are inverted from the original positive, thus enabling the blue color record to be placed in contact with the original positive and to impart color to the original positive from the areas B and D which have been impregnated in the blue color bath.

The red color record shown in Fig. 12, having the areas A and C impregnated with red, is obtained in a manner identical with that employed with the making of the blue color record. As shown in Fig. 10, a green filter is placed in the printing machine and a sensitized film 35 is placed therein with the negative 25 in front thereof in a manner similar to that shown in Fig. 7. The background color plate is also placed in registered position, as indicated, and green light rays are received thereby from the green filter. In this operation, the light rays will pass only through the blue portion B of the background color plate, so that only the area B of the film 35 will be light impressed through the blue portion of the background master plate, thus providing a red color record of the red portion of the background. As indicated in Fig. 11, the background master plate is removed from the printer, and the film 35 run then through the printer in registration with the second positive 26, the green light rays passing through the blue portions D of this action color plate 26 and exposing the corresponding action areas of the film 35, as shown in Fig. 12. The film 35 is then developed with the result that the areas B and D become opaque and are hardened so that the areas A and C will receive the red dye in which the film 35 is subsequently immersed, with the result that a red color record is obtained having red impregnated background areas A and red impregnated action areas C. The color records, or similar negatives obtained therefrom, are then run through a color transfer machine in contact with the original positive, so that the separate colors carried thereupon are transferred to the surface of the original positive, thus coloring the positive in such a manner that when it is projected upon the screen, a colored motion picture will result.

As hereinbefore explained, the coloring of the background portions A and B with the colors red and blue imprinted from the color records 29 and 35 will be evenly distributed in each frame of the film, thus preserving a steadiness in the projected image instead of the flickering color effect encountered where films are hand colored. This very desirable result is obtained by the forming of color records from a background master plate, as hereinbefore described, the color record being photographically obtained and therefore the same throughout the separate frames. The method makes possible the coloring of a large number of positive films at a relative low cost, owing to the fact that the colors may be applied to these films by mechanical means which are rapid and economical in operation, as compared to the applications of colors by hand. A distinct advantage of the invention is that no color screens need be employed during the photographing of the original negatives.

The method hereinbefore described employs color screens of only two separate colors. It is to be understood that various other colors may be represented, a very satisfactory arrangement being to employ red, green and violet filters so that a more extensive color representation may be obtained.

I claim as my invention:

1. In a process for coloring motion picture film: making a color plate of the stationary objects in a film; and employing said color plate to light impress a number of frames of a color record while preventing exposure of action areas thereof, to permit of a separate coloration of the latter.

2. In a process for coloring motion picture film: making a color plate of the stationary objects in a film; and employing said color plate to consecutively light impress a number of frames of a color record while preventing exposure of action areas thereof, to permit of a separate coloration of the latter.

3. In a process for coloring motion picture film: making a color plate of the stationary objects in a film; and employing said color plate to light impress a number of frames of a color record with a color filtered light which is passed through said color plate while preventing exposure of action areas thereof, to permit of a separate coloration of the latter.

4. In a process for coloring motion picture film: making a color plate of the stationary objects in a film; and employing said color plate to consecutively light impress a number of frames of a color record with a color filtered light which is passed through said color plate while preventing exposure of action areas thereof, to permit of a separable coloration of the latter.

5. In a process for coloring motion picture film: making a color plate of the stationary objects in a developed film; and printing a color record from said color plate by directing a filtered light through said color plate and upon consecutive frames of a sensitized film while preventing exposure of action areas thereof, to permit of a separate coloration of the latter.

6. In a process for coloring motion picture film: making a color plate of the stationary objects in a developed film; and printing a color record from said color plate by directing a filtered light through said color plate and upon consecutive frames of a sensitized film; while maintaining a mat over a part of said film to prevent exposure of the action areas in the consecutive frames, and subsequently coloring said action areas.

7. In a process for coloring motion picture film: making a color plate of the stationary objects in a developed film; and printing a color record from said color plate by directing a filtered light through said color plate and upon consecutive frames of a sensitized film; while maintaining a mat over a part of said film to prevent exposure of the action areas in the consecutive frames; making an action color plate from said developed film; and light impressing the action areas of said sensitized film with a filtered light which is passed through said action color plate.

8. In a process for coloring motion picture film: making a color plate of the stationary objects in a developed film; and printing a color record from said color plate by directing a filtered light through said color plate and upon consecutive frames of a sensitized film; while maintaining a mat over a part of said film to prevent exposure of the action areas in the consecutive frames; making a background mat having translucent areas corresponding to the action of said developed film; coloring said transparent areas to transform said background mat to an action color plate; and light impressing said action areas of said sensitized film with a filtered light passed through said action color plate.

9. In a process for coloring motion picture film: making a color plate of the stationary opjects in a developed film; and printing a color record from said color plate by directing a filtered light through said color plate and upon consecutive frames of a sensitized film; while maintaining a mat over a part of said film to prevent exposure of the action areas in the consecutive frames; blocking out the background of a duplicate positive; printing a negative from said duplicate positive and developing the image of the action to a substantially opaque condition; printing a background mat from said negative; said background mat having translucent areas corresponding to the action of said developed film; coloring said transparent areas to transform said background mat to an action color plate; and light impressing said action areas of said sensitized film with a filtered light passed through said action color plate.

10. In a process for coloring motion picture film: making a color plate of the stationary objects in a developed film by placing a sheet of transparent material over a frame of said developed positive, so that the image is viewable therethrough and applying colors to said sheet of transparent material; and printing a color record from said color plate by directing a filtered light through said color plate and upon consecutive frames of a sensitized film.

11. In a process for coloring motion picture film: making a color plate of the stationary objects in a developed film by placing a sheet of transparent material over a frame of said developed positive, so that the image is viewable therethrough, and applying colors to said sheet of transparent material; and printing a color record from said color plate by directing a filtered light through said color plate and upon consecutive frames of a sensitized film; while maintaining a mat over a part of said film to prevent exposure of the action areas in the consecutive frames; making an action color plate from said developed film; and light impressing the action areas of said sensitized film with a filtered light which is passed through said action color plate.

12. In a process for coloring motion picture film: making a color plate of the stationary objects in a developed film by placing a sheet of transparent material over a frame of said developed positive, so that the image is viewable therethrough, and applying colors to said sheet of transparent material; and printing a color record from said color plate by directing a filtered light through said color plate and upon consecutive frames of a sensitized film; while maintaining a mat over a part of said film to prevent exposure of the action areas in the consecutive frames; making a background mat having translucent areas corresponding to the action of said developed film; coloring said transparent areas to transform said background mat to an action color plate; and light impressing said action areas of said sensitized film with a filtered light passed through said action color plate.

13. In a process for coloring motion picture film: making a color plate of the stationary objects in a developed film by placing a sheet of transparent material over a frame of said developed positive, so that the image is viewable therethrough, and applying colors to said sheet of transparent material; and printing a color record from said color plate by directing a filtered light through said color plate and upon consecutive frames of a sensitized film; while maintaining a mat over a part of said film to prevent exposure of the action areas in the consecutive frames; blocking out the background of a duplicate positive; printing a negative from said duplicate positive and developing the image of the action to a substantially opaque condition; printing a background mat from said negative; said background mat having translucent areas corresponding to the action of said developed film; coloring said transparent areas to transform said background mat to an action color plate; and light impressing said action areas of said sensitized film with a filtered light passed through said action color plate.

In testimony whereof, I have hereunto set my hand at Los Angeles, California, this 5th day of May, 1923.

MAX HANDSCHIEGL.